US011868845B2

(12) United States Patent
McCormack

(10) Patent No.: US 11,868,845 B2
(45) Date of Patent: Jan. 9, 2024

(54) SYSTEMS AND METHODS FOR COUNTING ITEMS

(71) Applicant: FDR Services Corp., Hempsted, NY (US)

(72) Inventor: James Joseph McCormack, Lloyd Harbor, NY (US)

(73) Assignee: North Shore Architecture, PC, Hempstead, NY (US)

( * ) Notice: Subject to any disclaimer, the term of this patent is extended or adjusted under 35 U.S.C. 154(b) by 149 days.

(21) Appl. No.: 17/670,197

(22) Filed: Feb. 11, 2022

(65) Prior Publication Data

US 2022/0253667 A1 Aug. 11, 2022

Related U.S. Application Data

(60) Provisional application No. 63/148,143, filed on Feb. 11, 2021.

(51) Int. Cl.
*G06M 11/00* (2006.01)
*G06M 1/22* (2006.01)

(52) U.S. Cl.
CPC .............. *G06M 11/00* (2013.01); *G06M 1/22* (2013.01)

(58) Field of Classification Search
None
See application file for complete search history.

(56) References Cited

U.S. PATENT DOCUMENTS 6,760,099 B1 * 7/2004 Lewis ........................ G01J 1/16 356/218
11,681,894 B2 * 6/2023 Mohanty ................. G06M 3/08 377/107
2015/0023462 A1 * 1/2015 Marquez ................. G06M 9/00 377/6

* cited by examiner

*Primary Examiner* — Cassandra F Cox
(74) *Attorney, Agent, or Firm* — Torrey Pines Law Group, PC

(57) ABSTRACT

A system and method for counting items are described. A photocell detects an item, after which a converter converts the generated digital signal to an audio signal that a computing device can recognize. Data from the counting of items is displayed on a user interface of the computing device and/or other visual interfaces.

20 Claims, 10 Drawing Sheets

SYSTEMS AND METHODS FOR COUNTING ITEMS

CROSS-REFERENCE TO RELATED APPLICATIONS

Figure 1:
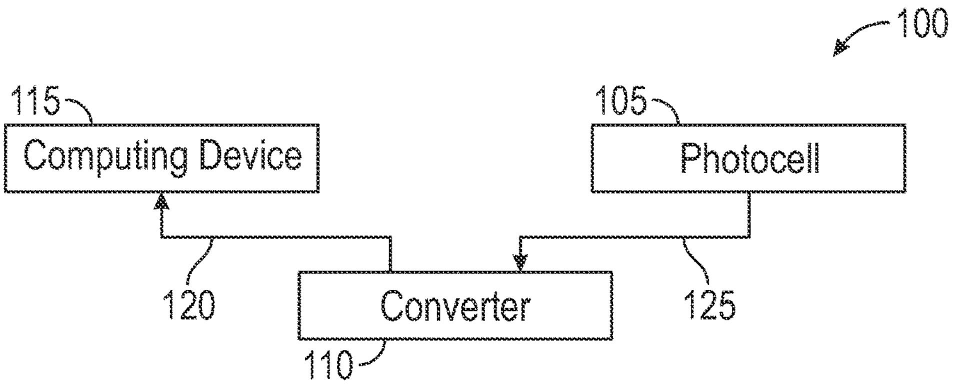

This application claims priority from U.S. Provisional Application No. 63/148,143 filed on Feb. 11, 2021, which is incorporated herein by reference in its entirety.

STATEMENT REGARDING FEDERALLY SPONSORED RESEARCH OR DEVELOPMENT

Not Applicable.

FIELD

The present teachings relate to systems and methods for automating the counting of items.

INTRODUCTION

Accurately counting items can be a hassle, especially when there are many items to count. Developing a system and method to count items while maintaining accuracy and keeping track of other pertinent data related to the items is beneficial in many environments.

Counting of items is commonplace for many instances, from seeds to pills. Laundry is another instance in which accurately counting items is of benefit. There may be environments in which multiple operators are judged based on their productivity in sorting laundry items. For efficiency purposes, there needs to be an objective way to monitor productivity. An operator who moves items along a conveyor belt system more quickly than another operator who is more lackadaisical needs to be recognized as the more productive operator. In this instance and others, an easily visible way to see the differences in productivity is beneficial.

SUMMARY

The present teachings include a system for counting items, comprising a computing device, a photocell, a converter, a logical communication between the converter and the computing device; and a logical communication between the photocell and the converter. The converter comprises In accordance with a further aspect, the converter is housed in a case In accordance with yet another aspect, the converter is at least one of battery powered and electricity powered.

In accordance with yet another aspect, the computing device is at least one of a computer, a tablet, a smartphone, and a laptop.

In accordance with yet another aspect, the converter converts a digital signal to at least one of a physical signal, a visual signal, and an audible signal.

In accordance with yet another aspect, the photocell is connected to a machine that processes at least one item.

In accordance with yet another aspect, the photocell detects the at least one item.

In accordance with yet another aspect, the logical communication between the photocell and the converter alerts the converter that the photocell has detected the at least one item.

In accordance with yet another aspect, the logical communication between the converter and the computing device alerts the computing device to record data associated with the at least one item.

In accordance with yet another aspect, the logical communication between the converter and the computing device allows the data to be depicted in a report.

In accordance with yet another aspect, the report is displayed on at least one of a user interface of the computing device and a screen.

In accordance with yet another aspect, contents of the report comprise at least one of amount produced, percentage completed, and amount required.

The present teachings include methods of counting items, comprising providing a machine that processes at least one item, having a photocell detect the at least one item, having the photocell communicate detection of the at least one item to a converter, having the converter communicate data associated with the at least one item to a computing device, and optionally displaying the data on at least one of a user interface of the computing device and a screen.

In accordance with a further aspect, a signal from the photocell communicates with the converter to indicate detection of the at least one item, with the signal being at least one of a light signal, an electrical signal, and a digital signal.

In accordance with yet another aspect, a signal from the converter communicates with the computing device to indicate detection of the at least one item, with the signal being at least one of a physical signal, a visual signal, an electrical signal, and an audible signal.

In accordance with yet another aspect, the machine is in at least one of a manufacturing environment and a production environment.

In accordance with yet another aspect, the data is depicted as a report.

In accordance with yet another aspect, contents of the report comprise at least one of amount produced, percentage completed, and amount required.

In accordance with yet another aspect, the report is depicted on at least one of a user interface of the computing device and a screen.

In accordance with yet a further aspect, the converter is housed in a case.

These and other features, aspects and advantages of the present teachings will become better understood with reference to the following description, examples and appended claims.

DRAWINGS

Those of skill in the art will understand that the drawings, described below, are for illustrative purposes only. The drawings are not intended to limit the scope of the present teachings in any way.

FIG. 1. A flowchart depicting the system.

Figure 2:
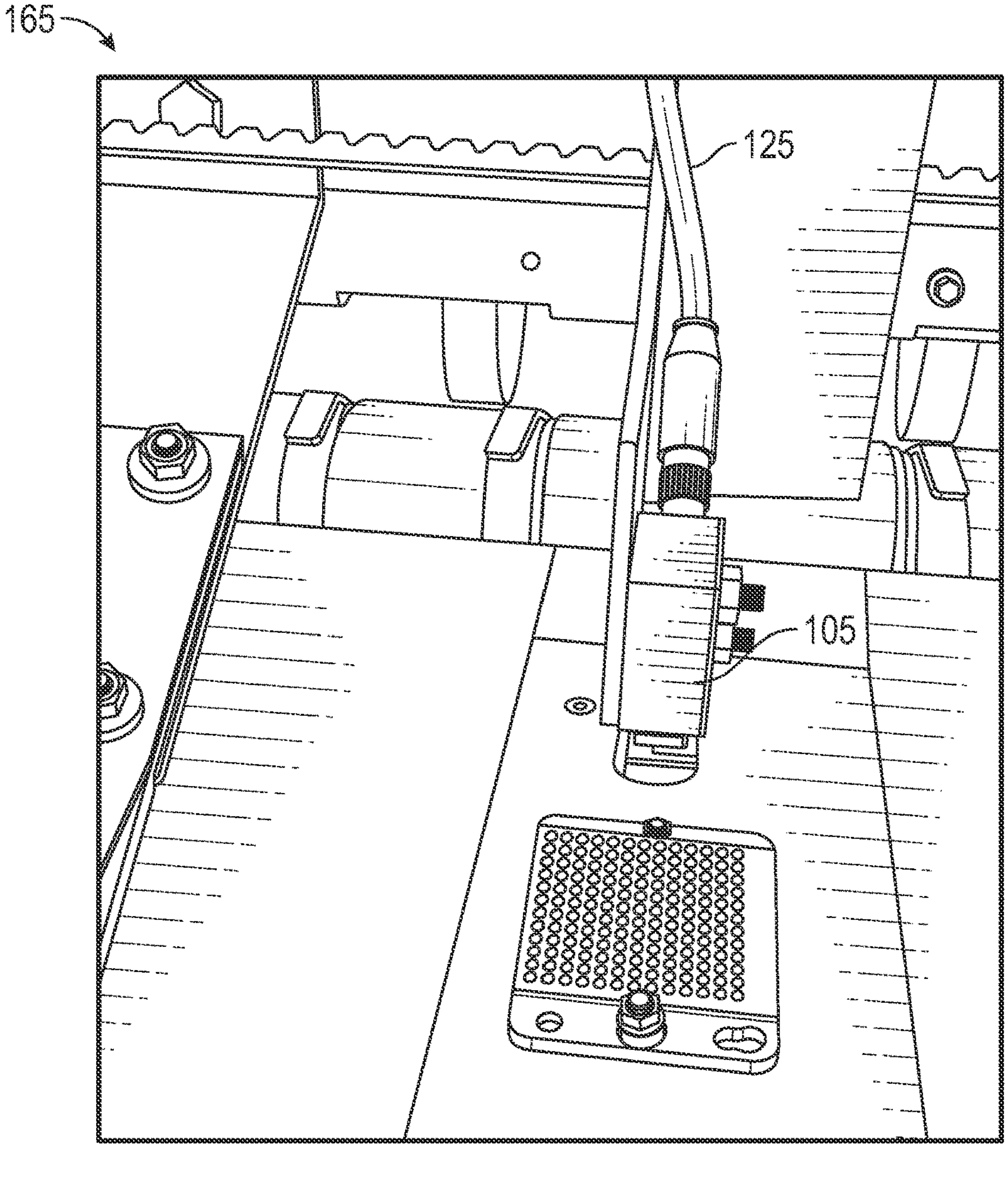

FIG. 2 Perspective view of the photocell mounted to the machine with the photocell/converter connection.

Figure 3:
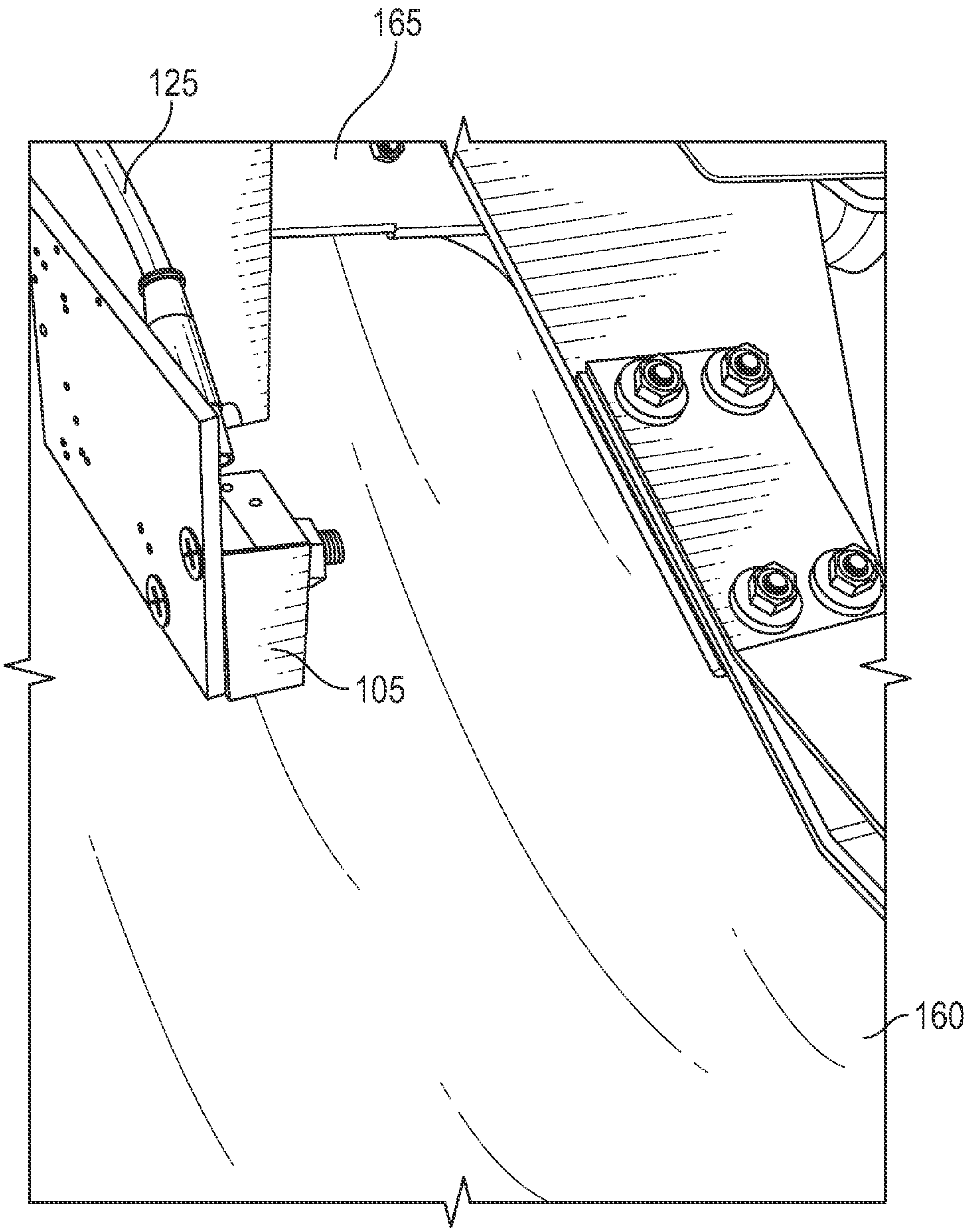

FIG. 3. Perspective view of an item being detected by the photocell.

Figure 4:
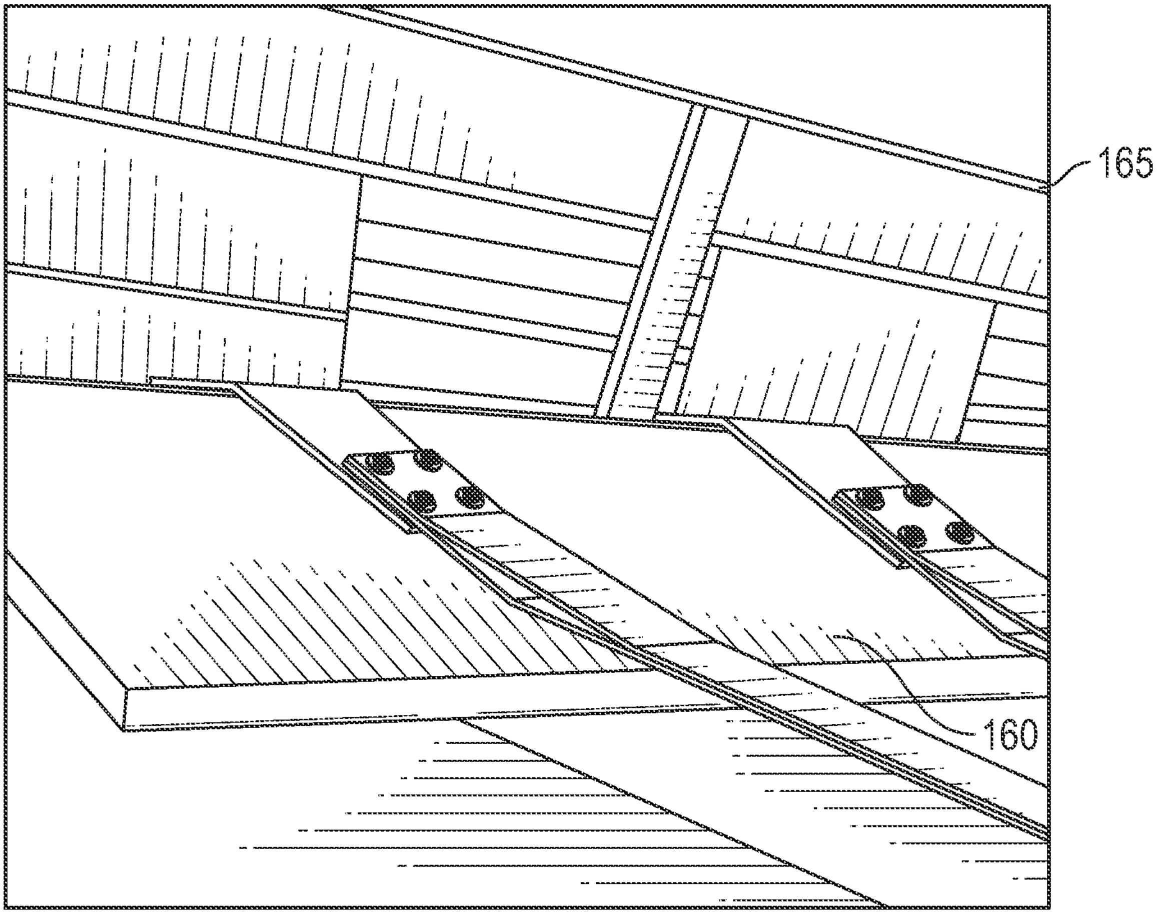

FIG. 4. Perspective view of an item moving through a machine.

Figure 5:
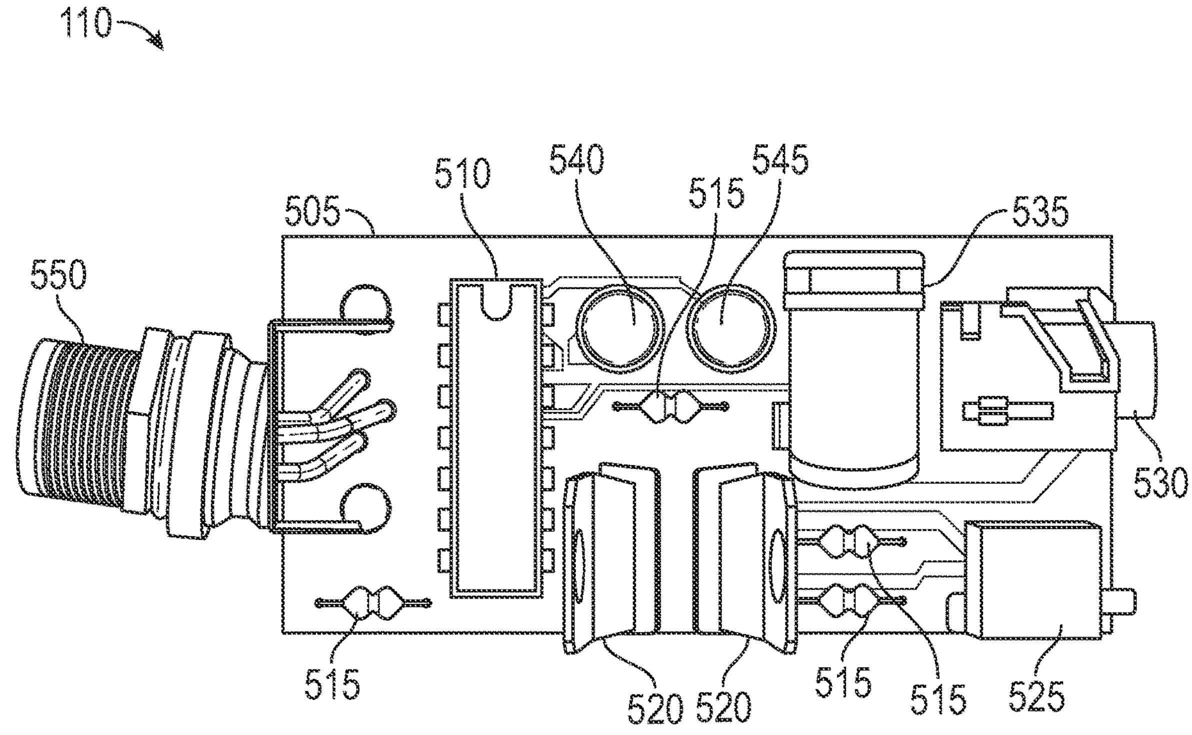

FIG. 5. A top view of the converter.

Figure 6:
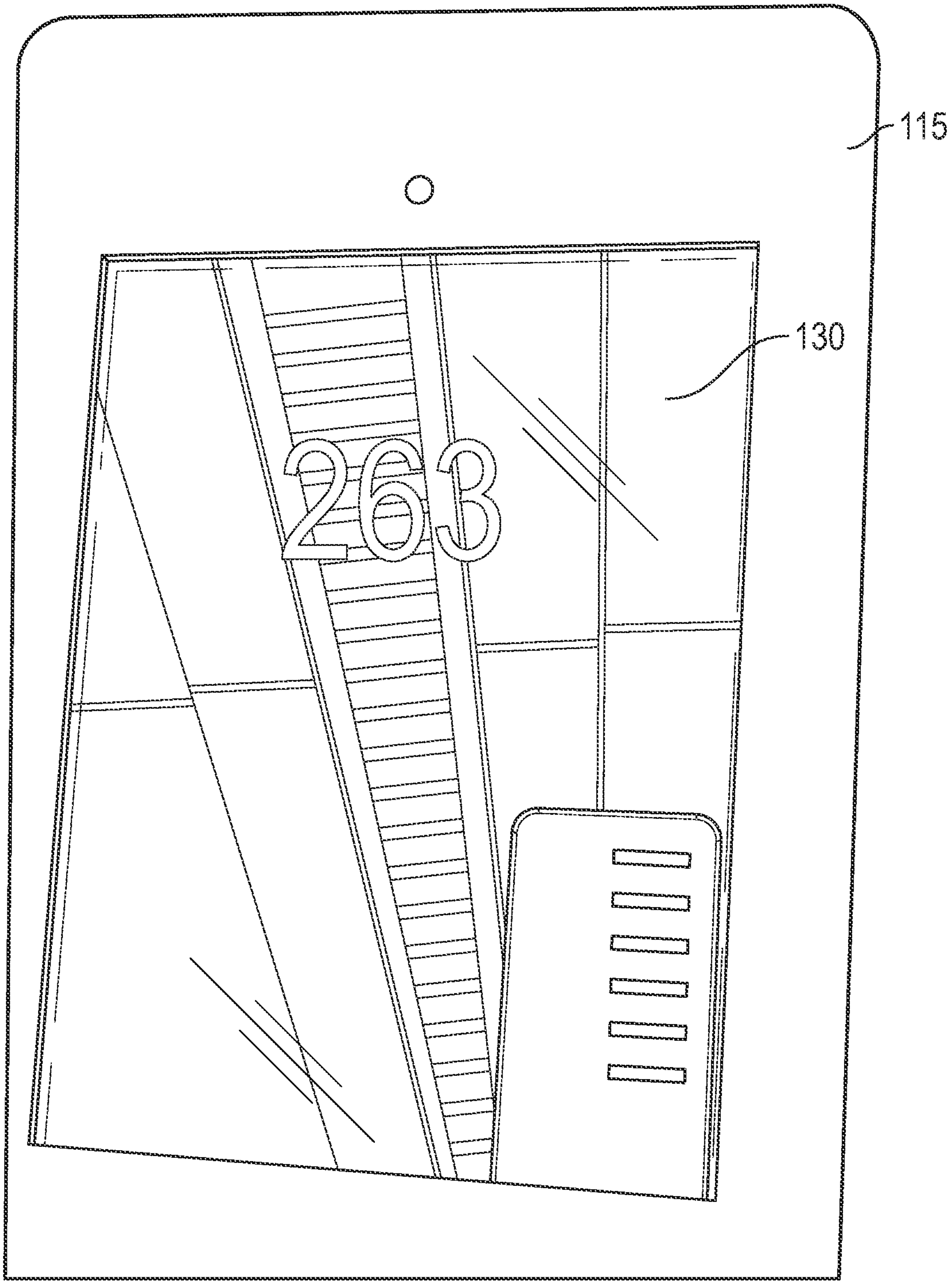

FIG. 6. A front view of a computing device and its user interface.

Figure 7:
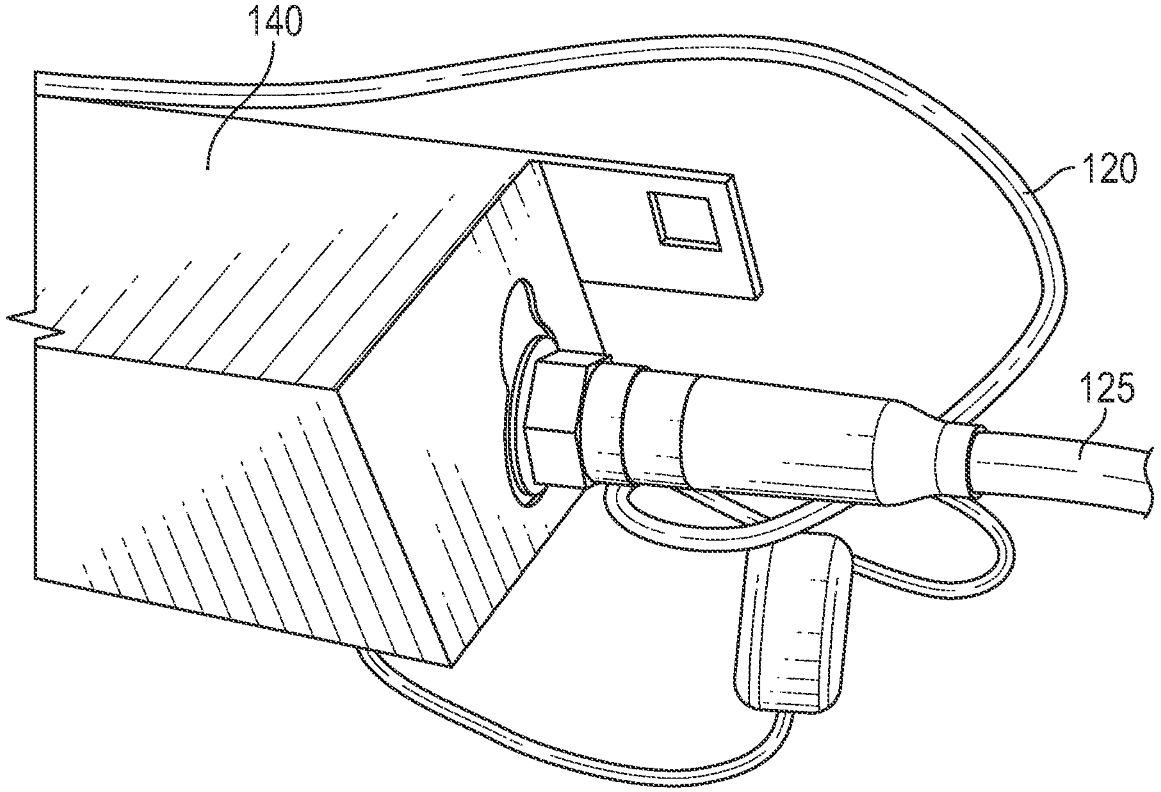

FIG. 7. Perspective view of a converter case with the photocell/converter connection and the computing device/converter connection.

Figure 8:
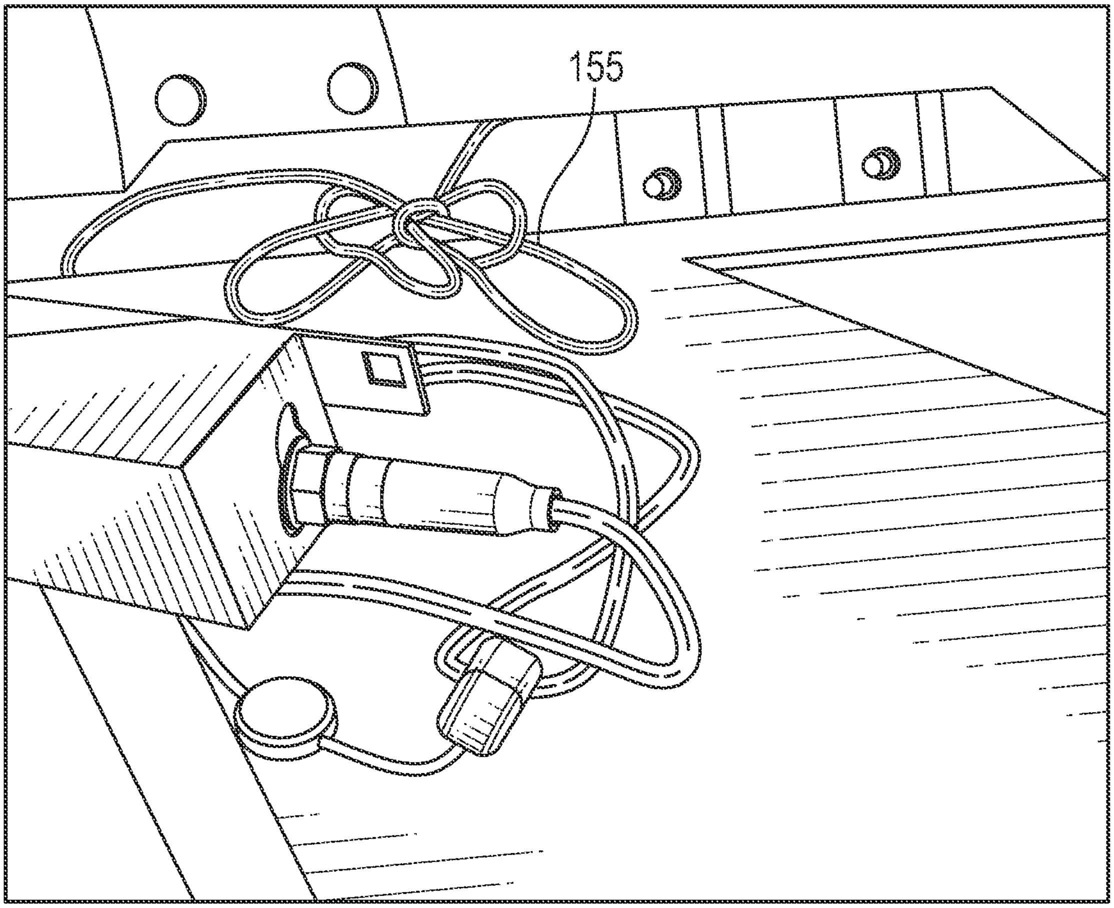

FIG. 8. Perspective view of a converter power cord.

Figure 9:
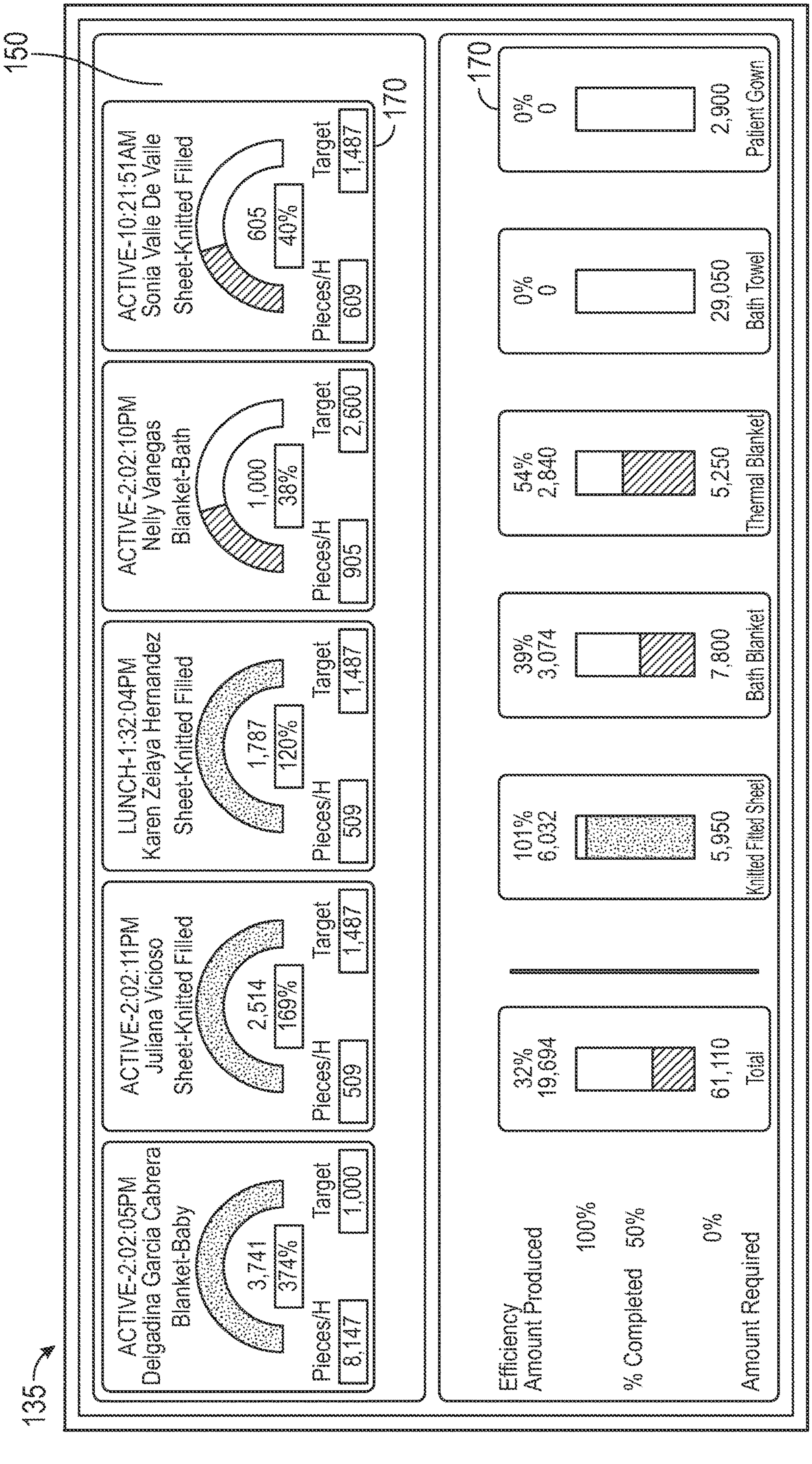

FIG. 9. Front view of a report shown on a screen.

Figure 10:
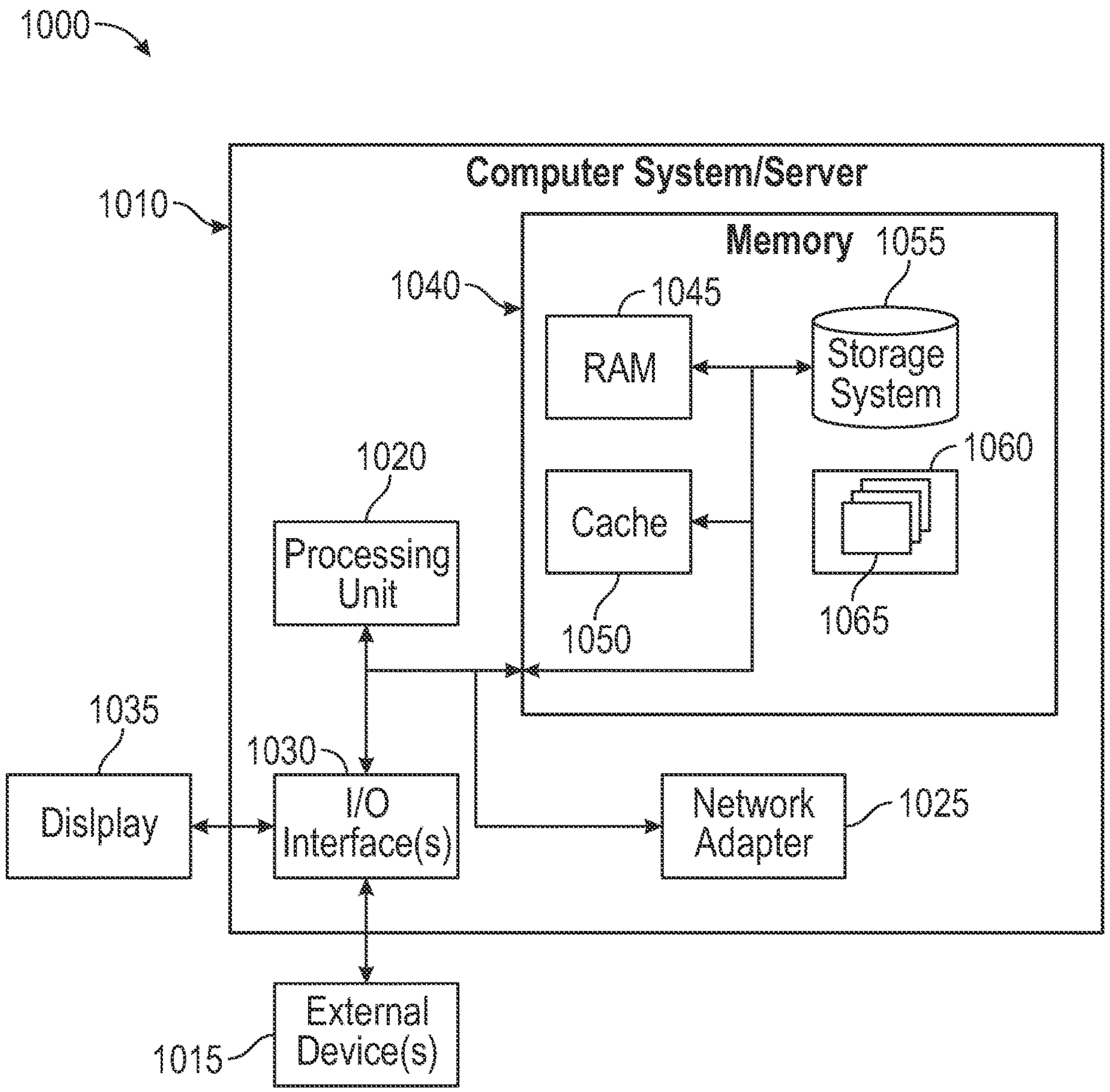

FIG. 10. A computing environment for generating the outputs of the systems and methods herein.

Figure 11:
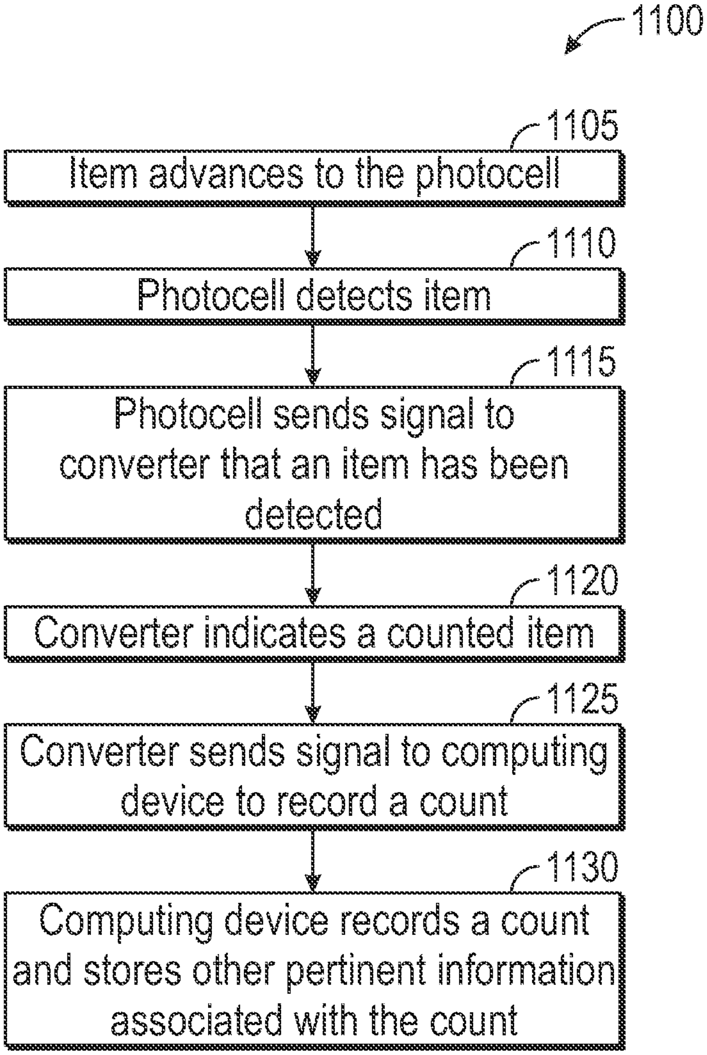

FIG. 11. A method for using the system.

DETAILED DESCRIPTION

The present invention is directed to a system for counting items. FIG. 1 depicts the system 100, which comprises a computing device 115, a photocell 105, a converter 110, and a connection between the converter and the computing device 120 and a connection between the photocell and the converter 125. In an embodiment, the connection between the converter and the computing device 120 may be a cable that connects the converter 110 to the computing device 115. In the same embodiment, the connection between the photocell and the converter 125 may be a cable that connects the photocell 105 and the converter 110.

FIG. 2 shows the photocell 105 connected to the connection between the photocell and the converter 125. In this embodiment, the photocell 105 is mounted to the machine 165 that processes items to be counted.

FIG. 3 shows an item 160, in this embodiment a towel, being detected by the photocell 105 as the item 160 is being processed by the machine 165. In this embodiment, the machine 165 is one that processes laundry items. In other embodiments, though, the photocell 105 may detect any item, and the machine 165 may process any item. In effect, a photocell 105 may detect any item 160 moving through any process; a machine 160 does not have to be involved in the system 100.

FIG. 4 shows an alternate view of an item 160 passing through the machine 165 that processes the item 160.

FIG. 5 is a top view of the converter 110. The converter 110 turns the signal triggered by the photocell 105 detecting an item 160 to a signal that a computing device 115 can recognize. The computing device 115 then registers a count of the item 160. In an embodiment, the signal that the converter 110 converts is a light signal. In another embodiment, the signal that the converter 110 converts is an electrical signal. In yet another embodiment, the signal that the converter 110 converts is a digital signal. The signal that the computing device 115 recognizes may be several signals. In an embodiment, the signal is a physical signal. In another embodiment, the signal is a visual signal. In another embodiment, the signal is an electrical signal. In another embodiment, the signal is an audible signal. An integrated circuit 510 is connected to a printed circuit board (PCB) 505. If one of the voltage inputs is low, the other input will be reproduced in true form at the output. If one of the voltage inputs is high, the signal on the other input will be reproduced inverted at the output. The integrated circuit 510 may be rated for temperature ranges between 0 degrees Celsius and 70 degrees Celsius. At least one linear voltage regulator 520 is attached to the PCB 505 to maintain a steady voltage, dissipating any between input and regulated voltages as heat. A dual in-line (DIP) switch 525 is also connected to the PCB 505 and customizes the electrical behavior of the converter 125. Light emitting diode (LED) lights 540 545 may attach to the PCB 505 and yield superior light output and wide viewing angle. An audio jack 530 may connect the connection of the computing device and the converter 120, serving the purpose of notifying the software to reroute signals through the audio port on a computing device to record counts. A connector receptacle 550 is used for panel mounting on the PCB 505. A power barrel connector jack 535 connects the converter 110 to a power source, connecting the system to external electricity. At least one resistor 515 attach to the PCB 505.

FIG. 6 is a front view of a computing device 115 and its user interface 130. In an embodiment, the computing device 115 is a computer. In another embodiment, the computing device 115 is a laptop. In another embodiment, the computing device 115 is a tablet. In another embodiment, the computing device is a smartphone. The computing device 115 may be any device with a processor and memory. In an embodiment, data associated with the item 160 being counted may be stored on the computing device 115. In another embodiment, data associated with the item 160 may be stored remotely.

FIG. 7 shows the case 140 that houses the converter 110. The connection that connects the photocell and the converter 125 exits the case 140 and connects to the photocell 105. The connection of the computing device and the converter 120 exits the case and connects to the computing device 115. In another embodiment, the connection of the photocell and the converter 125 is a wireless connection. In another embodiment, the connection of the computing device and the converter 120 is a wireless connection.

FIG. 8, a power cord for the converter 155 connects to the converter 110 housed in the converter case 140. The power cord 155 exits the case 140 and connects to an electrical outlet. In an embodiment, the converter 110 may be battery powered.

FIG. 9 depicts an embodiment of a report 135, shown on a monitor 150. In an embodiment, the report may be shown on a screen. In another embodiment, the report may be shown on the user interface 130 of the computing device 115. The report 135 comprises of data associated with the item 160 being counted. The report 135 may comprises at least one of amount of target amount, pieces per time, items produced, percentage completed, and amount required. Target amount refers to the amount of items one is aiming to process. Pieces per time refers to the number of items processed in a given time period (hours, days, week, etc.). Amount required refers to the number of items. Amount produced refers to the number of items counted. Percentage completed refers to the ratio of amount produced to amount required. In an embodiment, the report 135 may comprise a visual representation of the data. In another embodiment, the report 135 may comprise a numerical representation of the data. Metrics of importance (pertinent information associated with the count of the items) such as, but not limited to, percentage completed, items counted, pieces per time, target amount, and amount required, may be depicted in an area 170 on the monitor 150. This area 170 may be part of the report 135. Based on the number of counts being done at any given time, there may be more than one area 170.

The computer system/server 1010 is shown in FIG. 10 in the form of a general-purpose computing device 1000. The components of computer system/server 1010 may include, but are not limited to, one or more processors or processing units 1020, a system memory 1040, and a bus that couples various system components including system memory 1040 to processor 1020.

The bus represents one or more of any of several types of bus structures, including a memory bus or memory controller, a peripheral bus, an accelerated graphics port, and a processor or local bus using any of a variety of bus architectures. By way of example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1010 typically includes a variety of computer system readable media. Such media may be any available media that is accessible by computer system/server 1010, and it includes both volatile and non-volatile media, removable and non-removable media.

System memory 1040 can include computer system readable media in the form of volatile memory, such as random access memory (RAM) 1045 and/or cache memory 1050. Computer system/server 1010 may further include other removable/non-removable, volatile/non-volatile computer system storage media. By way of example, storage system 1055 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, memory 1040 may include at least one program product having a set (e.g., at least one) of program modules that are configured to carry out the functions of embodiments of the invention.

Program/utility 1060, having a set (at least one) of program modules 1065, may be stored in memory 1040 by way of example, and not limitation, as well as an operating system, one or more application programs, other program modules, and program data. Each of the operating system, one or more application programs, other program modules, and program data or some combination thereof, may include an implementation of a networking environment. Program modules 1065 generally carry out the functions and/or methodologies of embodiments of the invention as described herein. For instance, the program modules may carry out the calculations of metrics of importance, such as, but not limited to, items counted, items counted/time period, target items counted, percentage of the target of items counted Computer system/server 1010 may also communicate with one or more external devices 1015 (a keyboard, a pointing device, a display 1035, etc.), one or more devices that enable a user to interact with computer system/server 1010, and/or any devices (e.g., network card, modem, etc.) that enable computer system/server 1010 to communicate with one or more other computing devices 1000. The external device 1015 may also be the converter 110, which is in communication with the computing device 1000. Such communication can occur via Input/Output (I/O) interfaces 1030. Still yet, computer system/server 1010 can communicate with one or more networks such as a local area network (LAN), a general wide area network (WAN), and/or a public network (e.g. internet) via network adapter 1025. A network adapter 1025 communicates with the other components of computer system/server 1010 via bus. It should be understood that, although not shown, other hardware and/or software components could be used in conjunction with computer system/server 1010. Examples, include, but are not limited to: microcode, device drivers, redundant processing units, external disk drive arrays, RAID systems, tape drives, and data archival storage systems.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

The converter 110 communicates with the computing device 1000 via a network, which may be for example a wired and/or wireless network. If the network is wireless, or includes a wireless component, the network may be a Wi-Fi network compatible with the IEEE 802.11 standard, a Bluetooth network, and/or a network based upon another wireless communication standard(s). The network is connected to another network, which may comprise, for example, the Internet and/or a public switched telephone network (PSTN). The computing device 1000 may comprise, for example, a cellular telephone, such as a smartphone, a personal digital assistant (PDA), or another communication device such as a computer, laptop, and desktop. The network may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM 1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, GPS, CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical applications, or technical improvement over technologies found in the marketplace, or to enable others of ordinary skill in the art to understand the embodiments disclosed herein.

FIG. 11 depicts a method 1100 for using the system. The method 1100 is flexible. For instance, the use of the photocell 105 may be optional, as the converter 110 may be tied directly into the computing device 115. However, in this embodiment, the method 1100 entails a few steps. A step is to advance the item to the photocell 1105. Another step is the photocell detecting the item to be counted 1110. Another step is the photocell sending a signal to the converter that the photocell detected the item 1115. Another step is the converter indicating a counted item 1120. The way in which the converter indicates a counted item may be an audio signal, a visual signal, or a physical signal. Another step is the converter sending a signal to the computing device to record the count 1125. Another step is the computing device recording the count and storing that information along with other pertinent information associated with the count 1130.

Other pertinent information may include target amount, items counted per time, total amount produced, percentage completed, and amount required to be counted.

OTHER EMBODIMENTS

The detailed description set-forth above is provided to aid those skilled in the art in practicing the present invention. However, the invention described and claimed herein is not to be limited in scope by the specific embodiments herein disclosed because these embodiments are intended as illustration of several aspects of the invention. Any equivalent embodiments are intended to be within the scope of this invention. Indeed, various modifications of the invention in addition to those shown and described herein will become apparent to those skilled in the art from the foregoing description which do not depart from the spirit or scope of the present inventive discovery. Such modifications are also intended to fall within the scope of the appended claims.

What is claimed is:

1. A system for counting items comprising:

a computing device;

a photocell;

a converter, with the converter comprising a printed circuit board, an integrated circuit, at least one resistor, a linear voltage regulator, a dual-in-line switch, an audio jack, a power barrel connector jack, at least one LED light, and a connector receptacle;

a connection between the converter and the computing device; and a connection between the photocell and the converter.

2. The system of claim 1, wherein the converter is housed in a case.

3. The system of claim 1, wherein the converter is at least one of battery powered and electricity powered.

4. The system of claim 1, wherein the computing device is at least one of a computer, a tablet, a smartphone, and a laptop.

5. The system of claim 1, wherein the converter converts a digital signal to at least one of a physical signal, a visual signal, and an audible signal.

6. The system of claim 1, wherein the photocell is connected to a machine that processes at least one item.

7. The system of claim 6, wherein the photocell detects the at least one item.

8. The system of claim 7, wherein the connection between the photocell and the converter alerts the converter that the photocell has detected the at least one item.

9. The system of claim 8, wherein the connection between the converter and the computing device alerts the computing device to record data associated with the at least one item.

10. The system of claim 9, wherein the connection between the converter and the computing device allows the data to be depicted in a report.

11. The system of claim 10, wherein the report is displayed on at least one of a user interface of the computing device, a monitor, and a screen.

12. The system of claim 9, wherein contents of the report comprise at least one of target amount, pieces per time, amount produced, percentage completed, and amount required.

13. A method of counting items, comprising:

providing a machine that processes at least one item;

having a photocell detect the at least one item;

having the photocell communicate detection of the at least one item to a converter;

having the converter communicate data associated with the at least one item to a computing device; and optionally displaying the data on at least one of a user interface of the computing device, a monitor, and a screen.

14. The method of claim 13, wherein a signal from the photocell communicates with the converter to indicate detection of the at least one item, with the signal being at least one of a light signal, an electrical signal, and a digital signal.

15. The method of claim 13, wherein a signal from the converter communicates with the computing device to indicate detection of the at least one item, with the signal being at least one of a physical signal, a visual signal, an electrical signal, and an audible signal.

16. The method of claim 13, wherein the machine is in at least one of a manufacturing environment and a production environment.

17. The method of claim 13, wherein the data is depicted as a report.

18. The method of claim 17, wherein contents of the report comprise at least one of target amount, pieces per time, amount produced, percentage completed, and amount required.

19. The method of claim 18, wherein the report is depicted on at least one of a user interface of the computing device, a monitor, and a screen.

20. The method of claim 13, wherein the converter is housed in a case.

* * * * *